United States Patent
Müller et al.

(10) Patent No.: US 7,870,918 B2
(45) Date of Patent: Jan. 18, 2011

(54) DRIVE UNIT FOR A MOTOR VEHICLE

(75) Inventors: Roland Müller, Herrenberg (DE); Tobias Ostertag, Herrenberg (DE)

(73) Assignee: Daimler AG, Stuttgart (DE)

( * ) Notice: Subject to any disclaimer, the term of this patent is extended or adjusted under 35 U.S.C. 154(b) by 390 days.

(21) Appl. No.: 12/009,849

(22) Filed: Jan. 22, 2008

(65) Prior Publication Data

US 2008/0190677 A1    Aug. 14, 2008

Related U.S. Application Data

(63) Continuation-in-part of application No. PCT/EP2006/006708, filed on Jul. 8, 2006.

(30) Foreign Application Priority Data

Jul. 22, 2005    (DE) .................... 10 2005 034 278

(51) Int. Cl.
   B60K 1/00    (2006.01)
(52) U.S. Cl. .................................. 180/65.51
(58) Field of Classification Search .............. 180/65.1, 180/65.275, 65.51, 65.6, 308, 24.07, 6.48, 180/21, 242, 243; 903/906; 280/124.146
   See application file for complete search history.

(56) References Cited

U.S. PATENT DOCUMENTS

| | | | | | |
|---|---|---|---|---|---|
| 759,999 | A | * | 5/1904 | Kuhn | 180/63 |
| 760,747 | A | * | 5/1904 | Maxim | 180/63 |
| 1,840,407 | A | * | 1/1932 | Norman | 180/261 |
| 2,588,889 | A | * | 3/1952 | Sherwood | 180/223 |
| 3,469,648 | A | * | 9/1969 | Cannon | 180/261 |
| 4,798,260 | A | * | 1/1989 | Nakata et al. | 180/253 |
| 4,913,258 | A | * | 4/1990 | Sakurai et al. | 180/242 |
| 5,087,229 | A | * | 2/1992 | Hewko et al. | 475/149 |
| 5,127,485 | A | * | 7/1992 | Wakuta et al. | 180/65.51 |
| 5,150,763 | A | * | 9/1992 | Yamashita et al. | 180/252 |
| 5,156,579 | A | * | 10/1992 | Wakuta et al. | 475/161 |
| 5,163,528 | A | * | 11/1992 | Kawamoto et al. | 180/65.51 |
| 5,180,180 | A | * | 1/1993 | Yamashita et al. | 180/253 |
| 5,222,568 | A | * | 6/1993 | Higasa et al. | 180/65.51 |
| 5,355,039 | A | * | 10/1994 | Couture | 310/67 R |
| 5,382,854 | A | * | 1/1995 | Kawamoto et al. | 310/67 R |
| 5,398,776 | A | * | 3/1995 | Forster | 180/308 |
| 5,438,228 | A | * | 8/1995 | Couture et al. | 310/67 R |

(Continued)

FOREIGN PATENT DOCUMENTS

DE    198 58 395    6/2000

(Continued)

Primary Examiner—J. Allen Shriver, II
Assistant Examiner—Brodie Follman
(74) Attorney, Agent, or Firm—Klaus J. Bach

(57) ABSTRACT

In a drive unit for a motor vehicle having a vehicle body, an electric machine which is supported by the vehicle body, a sprung wheel suspension and a wheel supported thereby, and the wheel being drive-connected to a device for transmitting torque between the electric machine and the wheel, the wheel suspension comprises a strut unit and the device for transmitting torque is arranged between the electric machine and the wheel and extends coaxially with respect to the axis of the strut unit so as to form a compact design with small unsprung masses while providing for the possibility of a torque transfer between the electric machine and the wheel.

10 Claims, 4 Drawing Sheets

U.S. PATENT DOCUMENTS

| | | | | |
|---|---|---|---|---|
| 5,472,062 | A * | 12/1995 | Nagai et al. | 180/252 |
| 5,691,584 | A * | 11/1997 | Toida et al. | 310/67 R |
| 5,829,543 | A * | 11/1998 | Diaz | 180/181 |
| 6,113,119 | A * | 9/2000 | Laurent et al. | 280/124.1 |
| 6,904,987 | B2 | 6/2005 | Haas et al. | 180/65.6 |
| 6,942,049 | B2 * | 9/2005 | Shimizu | 180/65.6 |
| 6,948,578 | B2 | 9/2005 | Prucher | 180/65.51 |
| 7,118,119 | B2 * | 10/2006 | Amanuma | 280/124.135 |
| 7,216,731 | B2 * | 5/2007 | Kakinami et al. | 180/65.51 |
| 7,231,999 | B2 | 6/2007 | Phillips | 180/253 |
| 7,287,611 | B2 * | 10/2007 | Nagaya | 180/65.51 |
| 7,314,105 | B2 * | 1/2008 | Varela | 180/65.6 |
| 7,347,295 | B2 * | 3/2008 | Kurata | 180/65.51 |
| 7,353,904 | B2 * | 4/2008 | Phillips | 180/253 |
| 7,364,142 | B2 * | 4/2008 | Beck | 267/64.17 |
| 7,410,017 | B2 * | 8/2008 | Gradu | 180/65.6 |
| 7,413,203 | B2 * | 8/2008 | Kurata | 280/124.156 |
| 7,591,338 | B2 * | 9/2009 | Irikura | 180/242 |
| 7,621,357 | B2 * | 11/2009 | Suzuki et al. | 180/65.1 |
| 7,641,010 | B2 * | 1/2010 | Mizutani et al. | 180/65.51 |
| 7,658,251 | B2 * | 2/2010 | James | 180/65.1 |
| 7,681,897 | B2 * | 3/2010 | Beck | 280/124.16 |
| 7,686,315 | B2 * | 3/2010 | Kramer | 280/124.128 |
| 7,694,765 | B2 * | 4/2010 | Kitagawara et al. | 180/65.6 |
| 7,712,561 | B2 * | 5/2010 | Niwa | 180/65.51 |
| 7,735,588 | B2 * | 6/2010 | Murata | 180/65.51 |
| 2003/0015360 | A1 * | 1/2003 | Villeneuve | 180/65.6 |
| 2003/0019675 | A1 * | 1/2003 | Haas et al. | 180/65.6 |
| 2003/0146029 | A1 | 8/2003 | Heinen | |
| 2005/0023053 | A1 * | 2/2005 | Bennett | 180/65.1 |
| 2005/0056471 | A1 * | 3/2005 | Kurata | 180/65.5 |
| 2005/0199457 | A1 * | 9/2005 | Beck | 188/314 |
| 2005/0265858 | A1 * | 12/2005 | Klaus et al. | 417/374 |
| 2006/0048978 | A1 * | 3/2006 | Nagaya | 180/6.48 |
| 2006/0213707 | A1 * | 9/2006 | Heinen | 180/65.5 |
| 2006/0225931 | A1 * | 10/2006 | Kurata | 180/65.5 |
| 2007/0068715 | A1 * | 3/2007 | Mizutani et al. | 180/65.5 |
| 2007/0257570 | A1 * | 11/2007 | Walter et al. | 310/67 R |
| 2008/0179128 | A1 * | 7/2008 | Iwaki et al. | 180/242 |
| 2008/0190677 | A1 * | 8/2008 | Muller et al. | 180/65.5 |
| 2008/0202832 | A1 * | 8/2008 | Ai | 180/65.5 |
| 2008/0283314 | A1 * | 11/2008 | Suzuki et al. | 180/65.5 |
| 2008/0283315 | A1 * | 11/2008 | Suzuki et al. | 180/65.5 |
| 2008/0296080 | A1 * | 12/2008 | Ishii et al. | 180/308 |
| 2009/0000840 | A1 * | 1/2009 | Murata | 180/65.5 |
| 2009/0032321 | A1 * | 2/2009 | Marsh et al. | 180/65.51 |
| 2009/0071732 | A1 * | 3/2009 | Kim et al. | 180/24.07 |
| 2009/0101424 | A1 * | 4/2009 | Suzuki | 180/65.51 |
| 2009/0133944 | A1 * | 5/2009 | Nishioka et al. | 180/65.51 |
| 2009/0236158 | A1 * | 9/2009 | Sakuma et al. | 180/65.51 |
| 2009/0278415 | A1 * | 11/2009 | Park | 310/156.08 |
| 2010/0000811 | A1 * | 1/2010 | Iwano | 180/65.51 |

FOREIGN PATENT DOCUMENTS

| | | |
|---|---|---|
| DE | 198 60 562 | 6/2000 |
| EP | 0 621 171 | 10/1994 |

* cited by examiner

DRIVE UNIT FOR A MOTOR VEHICLE

This is a Continuation-In-Part application of pending International patent application PCT/EP2006/006708 filed Jul. 8, 2006 and claiming the priority of German patent application 10 2005 034 278.7 filed Jul. 22, 2005.

BACKGROUND OF THE INVENTION

The invention relates to a drive unit for a motor vehicle including an electric machine supported by the vehicle body, a wheel suspension connected to the vehicle body with springs for supporting the vehicle body and drive means extending between the electric machine and the wheel for transmitting a torque therebetween.

German laid-open patent application DE 198 58 395 A1 discloses a drive unit for a wheel driven vehicle in which a rim is driven by an electric motor. The rim is attached to a rocker arm which is mounted so as to be pivotable about a vehicle axis. The distance between the vehicle axis and the rotational axis of the rim is constant. The drive of the rim is provided by means of intermeshing gearwheels, a toothed belt or a chain.

It is the object of the present invention to provide a drive unit for a vehicle, which drive unit comprises at least one electric machine and has, in connection with a wheel suspension which ensures a high level of driving comfort, a compact design and small unsprung masses.

SUMMARY OF THE INVENTION

In a drive unit for a motor vehicle having a vehicle body, an electric machine which is supported by the vehicle body, a sprung wheel suspension and a wheel supported thereby, and the wheel being drive-connected to a device for transmitting torque between the electric machine and the wheel, the wheel suspension comprises a strut unit and the device for transmitting torque is arranged between the electric machine and the wheel and extends coaxially with respect to the axis of the strut unit so as to form a compact design with small unsprung masses while providing for the possibility of a torque transfer between the electric machine and the wheel.

The incorporation of an oscillation damper and a spring, usually a coil spring, is referred to as a strut unit. Strut units can also be used as wheel suspensions if they include also a stub axle.

Alternatively, it is also possible to use an air spring or a combination of a rubber bellows and an oscillation damper.

The arrangement of the device for transmitting torque between the electric machine and wheel, which is coaxial with respect to the strut unit, provides advantages as to the required installation space. The advantageous arrangement of the electric machine in a fixed fashion with respect to the vehicle, which is facilitated thereby, does not increase the unsprung mass, as is the case, for example, with wheel hub motors. Likewise, the electric machine and the further electrical components are not adversely affected in terms of their durability by the extreme environmental influences and the high level of dynamics, as they are in designs where they are movable together with the wheel and in particular are arranged adjacent the brake.

Furthermore, the drive unit according to the invention permits torque to be transmitted between an electric machine and a wheel whose distance from the electric machine varies.

If in a preferred embodiment the torque is transmitted between the electric machine and wheel by means of the piston and piston rod of an shock absorber, the dynamics of the shock absorber improve since, as a result of the rotational movement of the piston, there is not any breakaway torque or any static friction between the piston and cylinder of the shock absorber.

The inventive arrangement of the rotational axis of the electric machine which is concentric with respect to the strut unit has an advantageous effect on the required installation space, in particular if an electric machine is arranged inside the helical spring. If the electric machine surrounds the helical spring, the electric machine will have a relatively large diameter which results in advantages with respect to the maximum torque which can be generated by the electric machine.

An arrangement of the rotational axis of the electric machine outside the helical spring permits an advantageous arrangement with respect to the available installation space. In particular, the rotational axis of the electric machine can be arranged parallel to the axis of the strut unit.

When the electric machine is arranged near the wheel or wheels, the efficiency of the power transmission is also improved.

In one particularly preferred development, the strut unit is a MacPherson strut unit. The MacPherson strut unit comprises a complete wheel suspension system which is rotatably mounted to the vehicle frame so that steering movements are possible. The electric machine can then advantageously be arranged fixed to the vehicle or in such a way that it follows the steering movement of the wheel.

In addition to the use of the drive unit according to the invention as a main drive, the drive unit can preferably also serve as an additional drive in a hybrid vehicle. For example, one axis of a hybrid vehicle can be driven by an internal combustion engine and the wheels of a second axis can be driven by the drive units according to the invention. In particular, as a result of the particularly favorable arrangement of the drive unit according to the invention with respect to the required installation space in a rear-drive vehicle, the drive units according to the invention can be arranged on the wheels of the front axis. This increases the security through possible torque interventions on the front wheels and increases the regenerative braking power of rear-drive vehicles. It is therefore advantageous to implement an all-wheel functionality, in particular with respect to the required installation space.

The invention will become more readily apparent from the following description of exemplary embodiments thereof illustrated in simplified form in the drawings and explained in more detail in the following description on the basis of the accompanying drawings:

DESCRIPTION OF THE VARIOUS EMBODIMENTS

Figure 1:
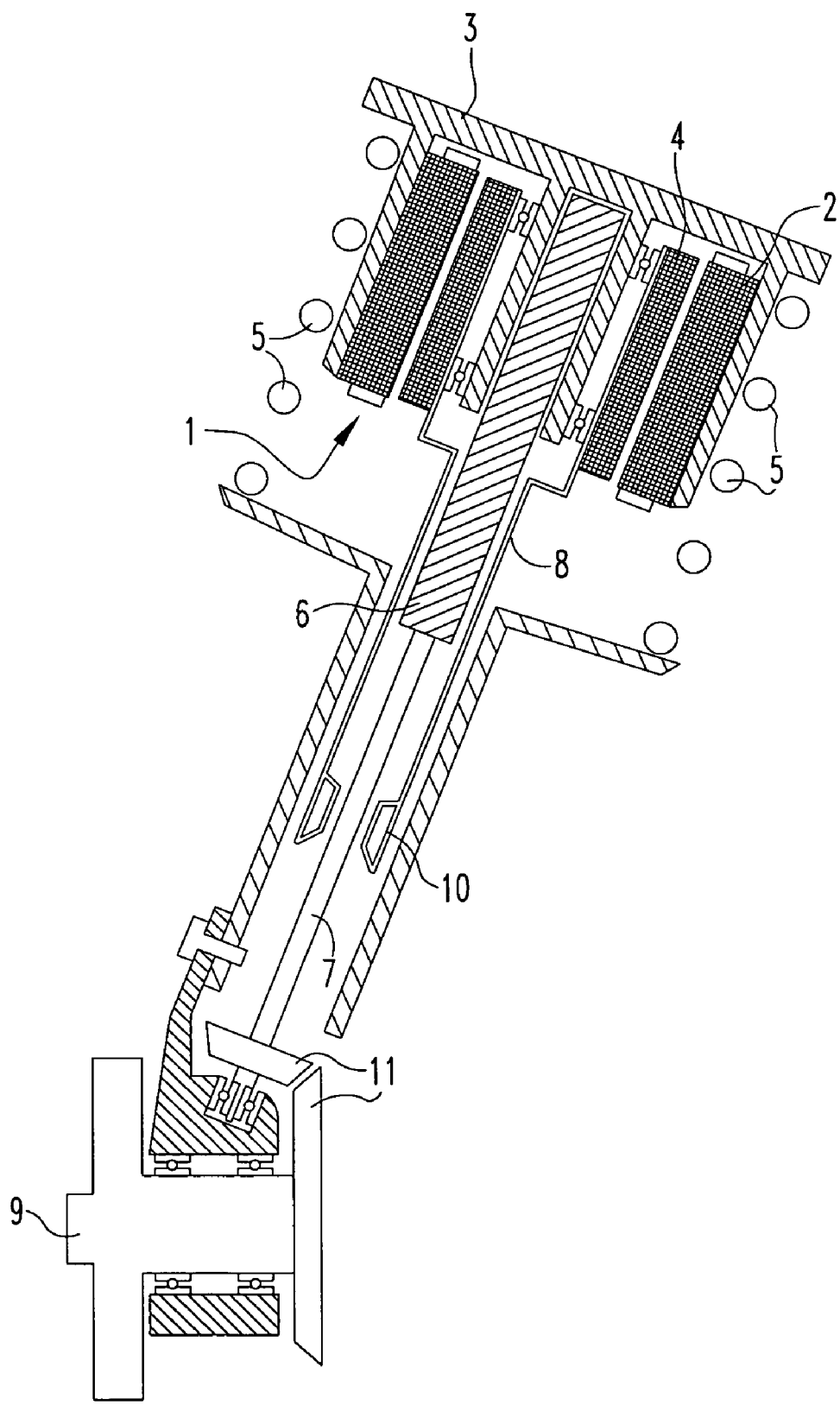
FIG. 1 shows a drive unit with an electric machine which is arranged concentrically within a helical spring and in which a torque is transmitted by an oscillation damper piston.

As a result of the uneven portions of an underlying surface, the wheels of a vehicle must carry out upward and downward movements as well as their rotational movements. When the vehicle travels at a high speed, as is customary in particular for passenger cars, these movements take place within a very short time, as a result of which very large acceleration and deceleration forces occur perpendicularly with respect to the underlying surface. As a result, large, pulse-like forces act on the vehicle, and these forces are greater the greater the the mass is which is subjected to such movements. The wheel suspensions form the connection between the vehicle frame and the wheels and comprise the spring suspension and the damping means which have the function of intercepting the shocks from the underlying surface and converting them into oscillations. The parts of the vehicle which are at least indirectly fixedly connected to the vehicle frame with respect to the upward and downward movements are referred to as fixed to the vehicle, while the parts or masses which are fixedly connected to the wheels are referred to as moved or unsprung masses.

The drive unit (illustrated in FIG. 1) for a vehicle shows an electric machine 1 with a stator 2 which is fixedly connected to an upper spring plate 3. The rotor 4 of the electric machine 1 which is embodied as an internal rotor is rotatably mounted on the upper spring plate 3.

The electric machine 1 can also be embodied with corresponding structural adaptations as an external rotor.

The upper spring plate 3 can be rotatably mounted on the vehicle frame (not illustrated) or fixedly connected to it.

The wheel suspension of the illustrated drive unit comprises a MacPherson strut unit which is formed from a helical spring 5 and an oscillation damper which is composed of a cylinder 6 and a piston 7.

As shown in FIG. 1, the electric machine 1 is arranged within the helical spring 5. This arrangement is particularly favorable for optional use of the drive unit according to the invention such as, for example, in the case of a vehicle which is equipped both with a conventional drive and with a hybrid drive, since it is not necessary to keep available any installation space for the electric machine 1 outside the strut unit.

The rotor 4 is fixedly connected to a first part 8 of the torque transmitting device between the electric machine 1 and a wheel or a wheel hub 9. The first part 8 is operatively connected to the oscillation damper piston 7 by means of an axially displaceable torsional coupling 10. The first part 8 is arranged concentrically with respect to the axis of the strut unit.

The torsion coupling 10, which is axially displaceable is distinguished by the fact that within an area, which extends axially and is at least as large as the maximum possible spring travel of the wheel suspension, it can transmit torques between a first part which is fixed to the vehicle and a second unsprung part. As a result, the torque transmitting device has a variable axial length. It is possible, for example, to use a sliding spring, a spline shaft, a polygonal shaft connection or a sliding sleeve which serve as an axially displaceable torsional coupling 10.

With the torque transmission (illustrated in FIG. 1) to the oscillation damper piston 7, the axial area of the oscillation damper piston 7, which is provided with a toothing for the purpose of transmitting torque is advantageously arranged in such a way that said axial area of the piston 7 is still located outside the cylinder 6 when the piston 7 is retracted to a maximum degree.

In the preferred embodiment according to FIG. 1 with a MacPherson strut unit, the angle between the axis of the oscillation damper piston 7 and the axis of the wheel 9 remains constant over the entire spring travel of the wheel 9 so that the re-direction of the torque, transmitted by the torque transmitting device, by the necessary angle from the axis of the oscillation damper piston 7 to the axis of the wheel 9 is provided, for example, by means of a level gear mechanism 11.

In other wheel suspension systems in which the angle between the axis of the oscillation damper piston 7 and the axis of the wheel 9 is variable over the spring travel, the level gear mechanism 11 is replaced according to the invention by means of another torque transmission means which compensates for this change in angle.

The arrangement of the oscillation damper piston 7 as part of the torque transmitting device is considered, within the scope of the present invention, to be coaxial with respect to the axis of the strut unit.

Figure 2:
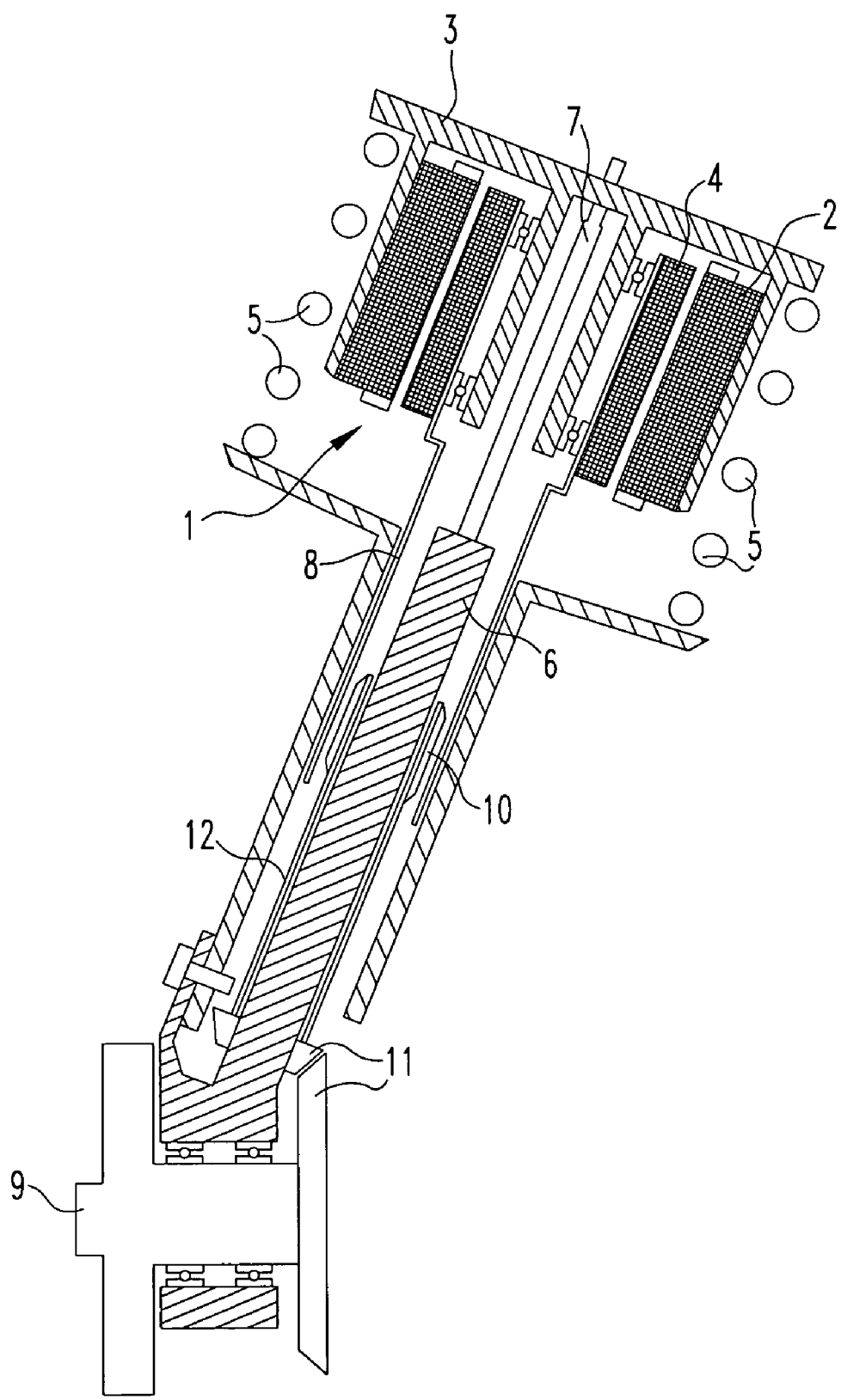
FIG. 2 shows a drive unit with an electric machine which is arranged concentrically within a helical spring.
Figure 3:
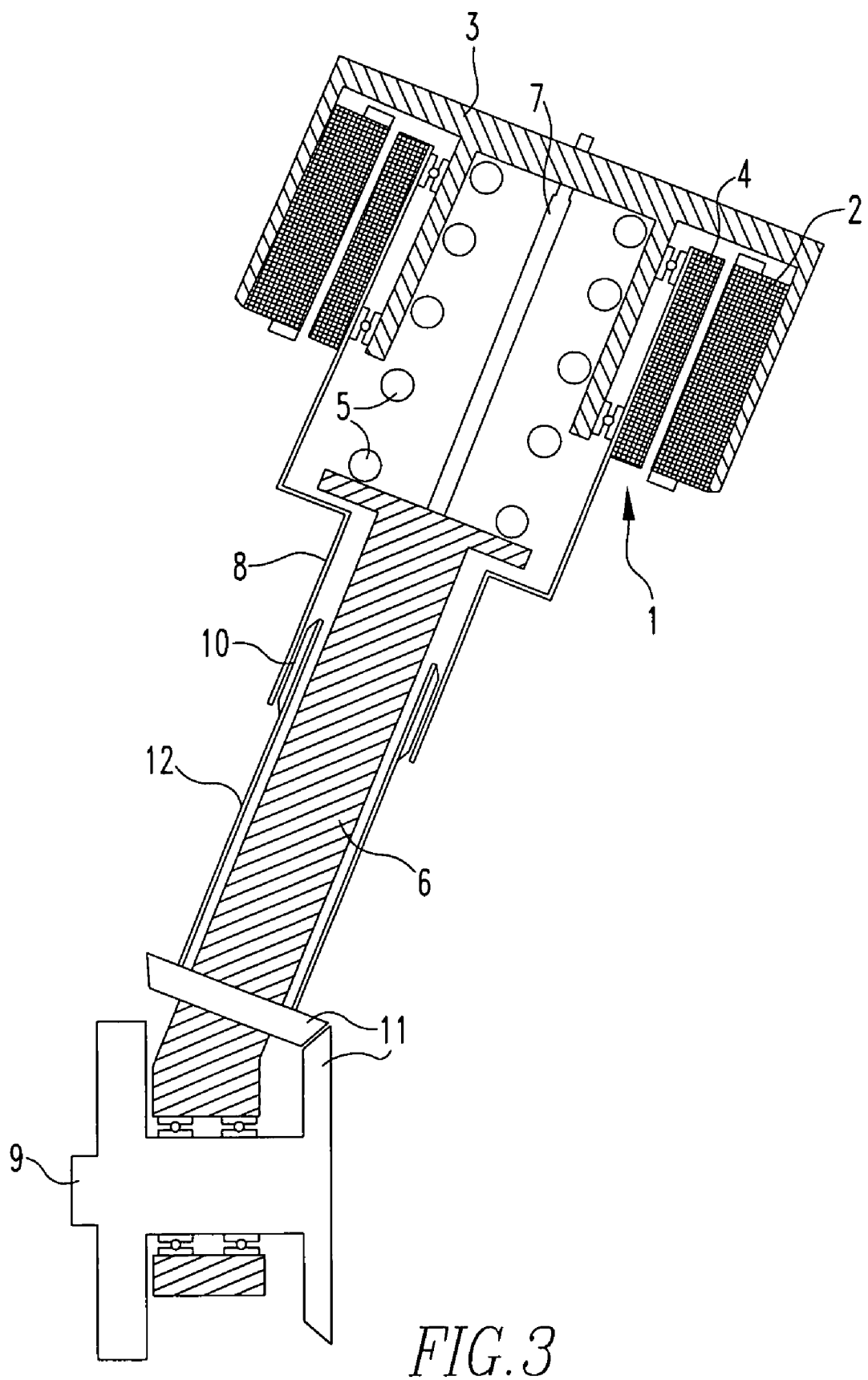
FIG. 3 shows a drive unit with an electric machine which is arranged concentrically outside a helical spring.
Figure 4:
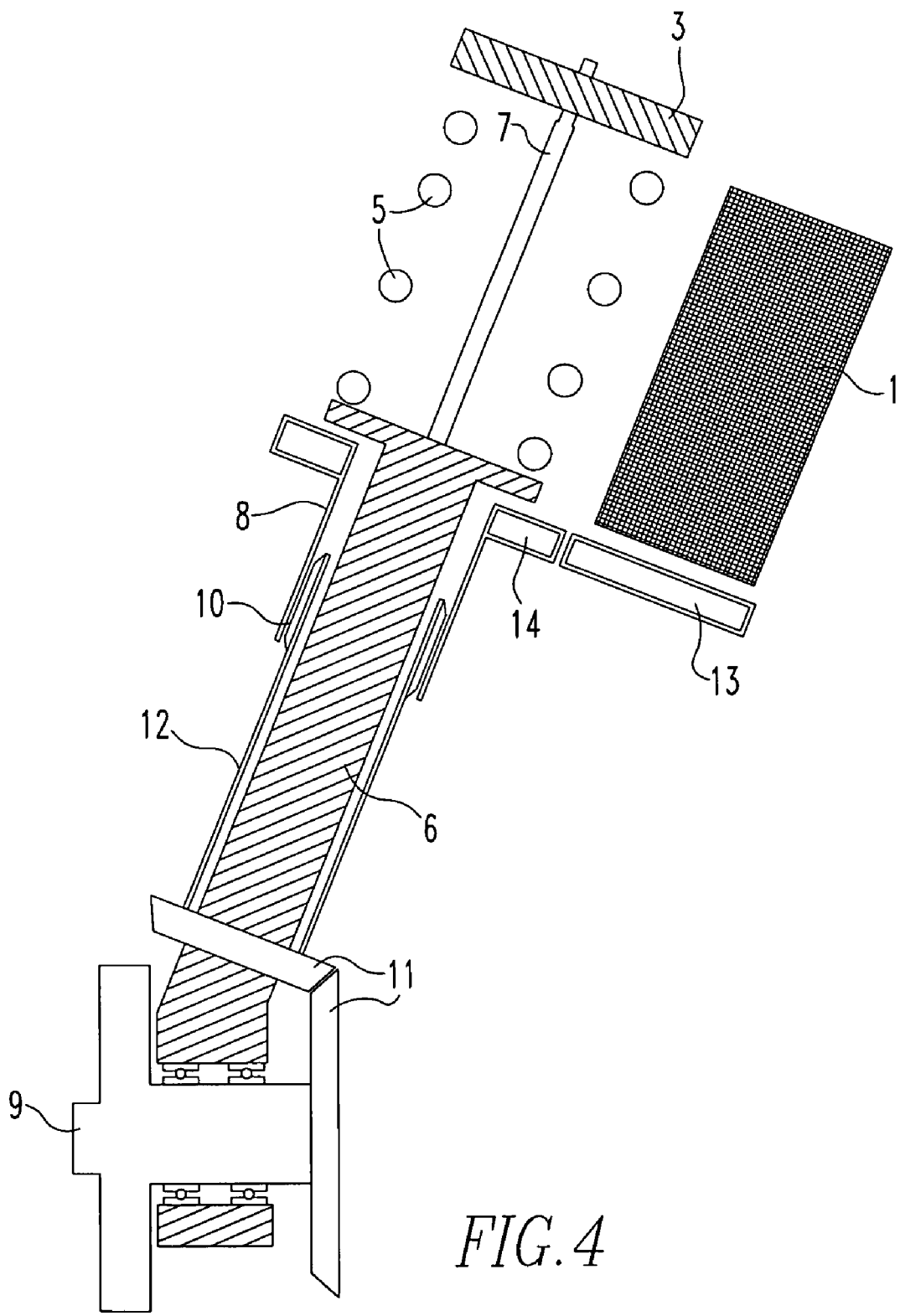
FIG. 4 shows a drive unit with an electric machine which is arranged outside a helical spring and whose rotational axis is arranged parallel to the axis of the strut unit.

FIGS. 2 to 4 illustrate alternative arrangements from that in FIG. 1, in which the cylinder 6 of the oscillation damper of the MacPherson strut unit is connected to the unsprung part of the wheel suspension and the piston 7 of the oscillation damper is rotatably mounted on the upper spring plate 3 so that steering movements are possible.

Identical elements are always provided with the same reference symbols. In addition, with respect to features and functions which remain the same, reference is made to the description relating to the exemplary embodiment as per FIG. 1. The subsequent description is essentially restricted to the differences in comparison with the exemplary embodiment according to FIG. 1.

FIG. 2 shows a drive unit in which the electric machine 1 is also arranged within the helical spring 5.

The rotor 4 is fixedly connected to the first part 8 of the torque transmitting device between the electric machine 1 and the wheel 9. As a result of the axially displaceable torsional coupling 10, the first part 8 is operatively connected to a second part 12 of the torque transmitting device. The second part 12 is also arranged concentrically with respect to the axis of the strut unit. The second part 12 is connected in a rotationally fixed fashion to the part of the level gear mechanism 11 which lies on the axis of the strut unit.

In the case of the drive unit illustrated in FIG. 3, the electric machine 1 is arranged concentrically outside the helical spring 5.

Compared to the exemplary embodiment according to FIG. 2, the electric machine 1 has a larger diameter, and the helical spring 5 has a smaller diameter. By virtue of a relatively large diameter, the electric machine 1 can generate a relatively large torque.

The dependence of the maximum torque to be generated by the electric machine 1 on the diameter of the electric machine 1 is to be taken into account in the selection of the arrangement of the drive unit according to the invention, for example as per the exemplary embodiments according to FIG. 2 or FIG. 3.

In the exemplary embodiment as per FIG. 4, the electric machine 1 is arranged outside the helical spring 5 in such a way that the rotational axis of the electric machine 1 is located parallel to the axis of the MacPherson strut unit. The electric machine 1 has, at its output shaft, a first gear wheel 13 which intermeshes with a second gear wheel 14. The second gear wheel 14 which is arranged concentrically with respect to the axis of the MacPherson strut unit is fixedly connected to the first part 8 of the torque transmitting device. In addition to the second gear wheel 14, all the elements of the torque transmitting device between the electric machine 1 and wheel 9 are arranged coaxially with respect to the axis of the MacPherson strut unit.

Instead of the two intermeshing gear wheels 13, 14, the torque can also be transmitted by means of a toothed belt or a chain, for example.

What is claimed is:

1. A drive unit for a motor vehicle having a vehicle frame, an electric machine (1) which is at least indirectly fixedly connected to the vehicle frame, a sprung wheel suspension and a wheel (9) supported thereby, the wheel (9) being rotated about a wheel axis and driven by a device for transmitting torque (10), the wheel suspension comprising a strut unit having an axis coaxial with the electric machine, and the device for transmitting torque (10) being arranged between the electric machine (1) and the wheel (9), coaxially with respect to the axis of the strut unit, the device for transmitting torque including a torque transmission structure (11) capable of redirecting the torque provided by electric machine (1) from an axis of the strut unit to an axis of the wheel (9) for driving the wheel (9).

2. The drive unit as claimed in claim 1, wherein the strut unit comprises an upper spring plate (3), and the electric machine (1) is fixedly connected to the upper spring plate (3).

3. The drive unit as claimed in claim 1, wherein the device for transmitting torque between the electric machine (1) and wheel (9) includes a torsion coupling permitting changing its axial length.

4. The drive unit as claimed in claim 3, wherein the device for transmitting torque between the electric machine (1) and the wheel (9) comprises at least two parts (8, 7, 12) which are operatively joined by means of an axially displaceable torsional coupling (10).

5. The drive unit as claimed in claim 4, wherein a part of the device for transmitting torque between the electric machine (1) and wheel (9) is a piston (7) of an oscillation damper.

6. The drive unit as claimed in claim 1, wherein the rotational axis of the electric machine (1) is arranged concentrically with respect to the strut unit.

7. The drive unit as claimed in claim 6, wherein the electric machine (1) concentrically surrounds a helical spring (5) of the strut unit.

8. The drive unit as claimed in claim 6, wherein a helical spring (5) of the strut unit concentrically surrounds the electric machine (1).

9. The drive unit as claimed in one of claim 1, wherein the rotational axis of the electric machine (1) is arranged outside a coil spring (5).

10. The drive unit as claimed in claim 9, wherein the rotational axis of the electric machine (1) is arranged parallel to the axis of the strut unit.

* * * * *